No. 785,808. PATENTED MAR. 28, 1905.
R. M. KEATING.
CARBURETER FOR HYDROCARBON ENGINES.
APPLICATION FILED FEB. 8, 1901.
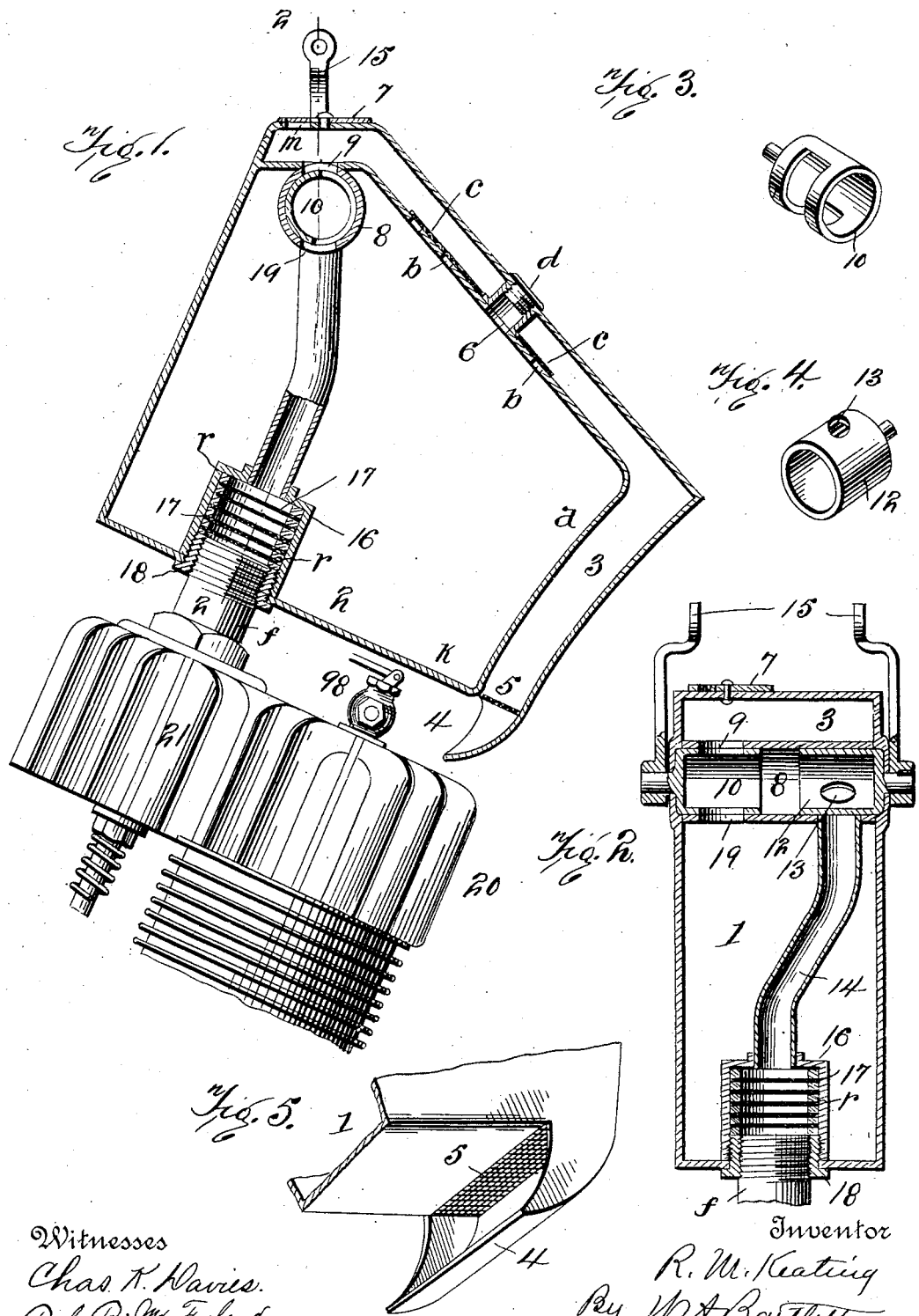
Witnesses
Chas. K. Davies.
Paul B. McFarland.
Inventor
R. M. Keating
By W. H. Bartlett
Attorney No. 785,808. Patented March 28, 1905.

UNITED STATES PATENT OFFICE.

ROBERT M. KEATING, OF MIDDLETOWN, CONNECTICUT, ASSIGNOR TO THE R. M. KEATING MOTOR COMPANY, OF PORTLAND, MAINE, A CORPORATION OF MAINE.

CARBURETER FOR HYDROCARBON-ENGINES.

SPECIFICATION forming part of Letters Patent No. 785,808, dated March 28, 1905.

Original application filed December 8, 1900, Serial No. 39,174. Divided and this application filed February 8, 1901. Serial No. 46,510.

*To all whom it may concern:*

Be it known that I, ROBERT M. KEATING, residing at Middletown, in the county of Middlesex and State of Connecticut, have invented certain new and useful Improvements in Carbureters for Hydrocarbon-Engines, of which the following is a specification, reference being had therein to the accompanying drawings.

This application is a division of my application No. 39,174, filed December 8, 1900.

This invention relates to carbureters for hydrocarbon-engines.

The object of the invention is to produce a carbureter for engines of the kind in which hydrocarbon is exploded for propulsion, such as gasolene-engines, and to maintain the carbureter in condition to vaporize the hydrocarbon under the best conditions the carbureter is made to take in air which has been heated by the engine, so that the gasolene is kept from freezing or becoming too cold and mixture is made with warmed gases.

Figure 1 is a vertical longitudinal section of a gasolene-tank and mixer connected to the cylinder-head of an engine adapted for use with a motor-bicycle or other automobile vehicle. Fig. 2 is a section on line 2 2, Fig. 1. Figs. 3 and 4 are perspective views of the turn-plugs of the feeder. Fig. 5 is a broken perspective detail of the strainer-mouth of the air-feeder.

The tank 1 is in form of an irregular pentagon, with parallel perpendicular end or side walls and is preferably constructed of aluminium for the advantage of lightness. This pentagonal form adapts the tank to lie closely inside a bicycle-frame of common "diamond" shape.

Tank 1 is placed close to the top of the engine-cylinder 20. The box is less in thickness than in height or breadth, so as to lie closely within the frame of a bicycle and not project far at either side of such frame. The lower surface 2 of the tank is preferably about parallel with the upper surface of the motor-cylinder 20.

A passage-way 3 or air-tank extends from side to side inside of the outer casing of the tank and between the same and inner wall or partition $a$. A mouthpiece or deflector 4 projects downward from the casing and curves forward toward the front side of the casing, so as to guide the hot air rising from the top of the engine-cylinder to the air-passage 3. A reticulated diaphragm 5 prevents the passage of flame into the mouth of the passage 3.

The partition $a$ extends forward about parallel with the inclined top of the tank, as shown. Openings $b\ b$ from the passage 3 permit the entrance of hot air from passage 3 to the tank to supply the place of lost liquid or permit the escape of gas from the tank should any considerable pressure be therein generated. Wire-gauze $c$ may cover these openings $b$.

A filling tube or nozzle 6 extends across passage 3 for filling the tank. This tube may be closed by cap $d$. The tank, constructed with inclined top, fits within the frame of a bicycle, as ordinarily constructed. The hot-air passage inside the casing tends to maintain the gasolene at good vaporizing temperatures.

A tube 8 extends transversely of the tank and directly under the forward extension of passage 3.

A passage or opening 9 19 extends through both walls of this transverse tube 8. The upper opening 9 connects with passage 3, while lower opening 19 communicates with the interior of the tank.

A hollow plug 10 closes the outer end of tube 8, and this plug may be turned in the tube after the manner of a cock or spigot. One side of the plug 10 is mortised for about half the circumference. As the plug is turned from the midway position of Fig. 1, it may open air-passage 9 and close gas or vapor passage 19 to a greater or less extent, or the operation may be the converse of that indicated. Thus the position of plug 10 controls the admission of both air and vapor into tube 8 through the openings described, and the relative quantity of the two may be adjusted. At the other end of tube 8 there is another hollow turn-plug, 12, which has a single passage 13 through its side wall. This passage may be brought into communication with the tube 14, which extends downward from tube 8 inside the tank. By turning the plug 12 the outflow from tube 8 of mingled vapor and air may be controlled. Lever 15 serves to actuate plug 12. Lever 15' serves to actuate plug 10.

Tube or pipe 14 communicates with a thimble 16, which thimble is inside the wall of tank 1 and opens through the lower wall thereof. A screw-threaded sleeve 18 enters the bottom of this thimble. A number of rings $r\ r$ serve to confine and separate the reticulated diaphragms 17, which are confined in the thimble 16. Thus the thimble 16 becomes a mixing-chamber, which is inclosed in the gasolene-tank. The diaphragms 17 may be removed and replaced by the removal of sleeve 18.

The valve-chamber 21 of the engine receives the mixed air and vapor from the thimble or mixing-chamber through a short pipe $f$, which connects the mixing-chamber to the valve-chamber of the engine.

An escape-valve 98 of the engine is directly under the floor K of the tank and in front of the funnel-mouth or deflector 4 of the passage 3. When the engine is started, this valve 98 is opened to permit air escape from the engine-cylinder, and valve 98 may be left open to permit a small escape of hot gases from the engine should the gasolene in the tank become too cold. The flash of flame from the engine is excluded from the gasolene-tank by the reticulated diaphragms 5 and $c\ c$.

An opening $m$ in the top of the tank permits inspection of the valve or turn-plug 10. This opening is covered by a pivoted cover 7.

The control of admission both of air and vapor to the supply-passage by a single turn-cock gives great facility for the regulation of the quantity of mixed vapor to the engine.

The form of the tank adapts it for convenient use with a gasolene-engine on a bicycle. The ability to maintain the heat of the tank by the exhaust from the engine and the introduction of hot air from near the surface of the engine-head enables the operator to control the condition of the vapor in the mixer, as well as the liquid in the tank, with great facility.

What I claim is—

1. In combination with the cylinder-head of a gasolene-engine, a fuel-supply tank arranged above said cylinder, an air-trunk having an open mouth in proximity to the cylinder-head, said trunk extending along one side of the supply-tank and having an opening into the tank, a transverse tube into the tank having openings both into the supply-tank and the air-trunk, a pipe leading from this tube to the engine, and a valve in the transverse tube controlling both the air-supply from the air-trunk and the gas-supply from the tank.

2. In combination with the cylinder-head of a gasolene-engine, the sheet-metal supply-tank arranged above the same to be heated by radiation, an air-trunk extending in contact with one side of the tank and having an open mouth in proximity to the engine-cylinder, a transverse tube in the tank having openings both into the tank and into the air-trunk, both openings adjustably controlled by a single valve, and a pipe connecting said transverse tube to the engine.

3. The combination with the gasolene-tank above the engine-cylinder head, so the gasolene is heated by the radiation from the cylinder, of a hot-air passage extending from near the cylinder-head along one side and the top of the tank, and separate connecting-passages from the tank and hot-air passage to the mixing-chamber, all substantially as described.

4. The gasolene-tank arranged above the engine, a valve in the head of the engine opening toward the gasolene-tank, an air-supply pipe with a mouth near said valve and leading inside the gasolene-tank, said supply-pipe having gauze shields as described, mixing-chamber extending toward the engine, and mechanism for introducing heated air from the supply-pipe and vapor from the gasolene-tank together into the mixing-chamber, all combined substantially as described.

In testimony whereof I affix my signature in presence of two witnesses.

ROBERT M. KEATING.

Witnesses:
ALLEN WEBSTER,
G. H. NOYES.